United States Patent
Patel et al.

(10) Patent No.: US 10,442,604 B2
(45) Date of Patent: *Oct. 15, 2019

(54) METHOD OF STABILIZING A PLASTIC AEROSOL CONTAINER

(71) Applicant: GRAHAM PACKAGING COMPANY, L.P., Lancaster, PA (US)

(72) Inventors: Tapan Y. Patel, Nashua, NH (US); Thomas E. Nahill, Amherst, NH (US); Stephen R. Guerin, Milford, NH (US)

(73) Assignee: GRAHAM PACKAGING COMPANY, L.P., Lancaster, PA (US)

(*) Notice: Subject to any disclaimer, the term of this patent is extended or adjusted under 35 U.S.C. 154(b) by 43 days.

This patent is subject to a terminal disclaimer.

(21) Appl. No.: 15/657,605

(22) Filed: Jul. 24, 2017

(65) Prior Publication Data

US 2017/0320654 A1 Nov. 9, 2017

Related U.S. Application Data

(60) Continuation of application No. 14/571,654, filed on Dec. 16, 2014, which is a division of application No.
(Continued)

(51) Int. Cl.
*B65D 83/38* (2006.01)
*B65B 31/00* (2006.01)
(Continued)

(52) U.S. Cl.
CPC .............. *B65D 83/38* (2013.01); *B29B 11/14* (2013.01); *B65B 31/003* (2013.01); *B29B 11/08* (2013.01);
(Continued)

(58) Field of Classification Search
CPC ....... B65D 83/38; B65B 31/003; B29B 11/14; B29B 2911/14106; B29B 2911/14466;
(Continued)

(56) References Cited

U.S. PATENT DOCUMENTS 2,841,190 A 7/1958 Scheck
3,718,165 A * 2/1973 Grothoff .................. B65B 3/04
137/583
(Continued)

FOREIGN PATENT DOCUMENTS

CN 101460390 A 6/2009
EP 0 403 259 A1 12/1990
(Continued)

OTHER PUBLICATIONS

U.S. Appl. No. 13/031,877 (U.S. Pat. No. 9,221,596), filed Feb. 22, 2011 (Dec. 29, 2015).
(Continued)

*Primary Examiner* — Kareen K Thomas
(74) *Attorney, Agent, or Firm* — Baker Botts L.L.P.

(57) ABSTRACT

A plastic aerosol container includes a main body portion that is constructed and arranged to withstand aerosol pressurization within a range that is about 50-300 psig. The plastic aerosol container also includes a finish portion that is unitary with the main body portion. The finish portion may be threaded or unthreaded. The finish portion has a side wall, an upper sealing surface, at least one helical thread and a support ledge beneath the helical thread. Reinforcement structure is positioned beneath the support ledge for reinforcing the finish portion against deformation due to the pressurization. A method of stabilizing a plastic aerosol container is also disclosed.

15 Claims, 8 Drawing Sheets

Related U.S. Application Data

13/031,883, filed on Feb. 22, 2011, now Pat. No. 8,935,904.

(51) Int. Cl.
*B29B 11/14* (2006.01)
*B29B 11/08* (2006.01)

(52) U.S. Cl.
CPC ............... *B29B 2911/1402* (2013.01); *B29B 2911/1404* (2013.01); *B29B 2911/14026* (2013.01); *B29B 2911/14033* (2013.01); *B29B 2911/1444* (2013.01); *B29B 2911/14106* (2013.01); *B29B 2911/14133* (2013.01); *B29B 2911/14326* (2013.01); *B29B 2911/14333* (2013.01); *B29B 2911/14466* (2013.01); *B29B 2911/14473* (2013.01); *B29B 2911/14553* (2013.01)

(58) Field of Classification Search
CPC ... B29B 2911/1444; B29B 2911/14333; B29B 2911/14326; B29B 11/08; B29B 2911/14473; B29B 2911/1404; B29B 2911/14033; B29B 2911/14026; B29B 2911/1402; B29B 2911/14553; B29B 2911/14133
USPC ....... 215/44, 42, 40, 43, 201, 217, 218, 223, 215/329; 220/657, 288
See application file for complete search history.

(56) References Cited

U.S. PATENT DOCUMENTS

| | | | |
|---|---|---|---|
| 3,774,810 A | 11/1973 | Corsette | |
| 3,837,527 A * | 9/1974 | Kutik | B65D 83/38 220/501 |
| 3,910,442 A | 10/1975 | Gargano | |
| 4,120,135 A * | 10/1978 | Baldyga | B67C 3/24 53/367 |
| 4,361,256 A | 11/1982 | Corsette | |
| 4,671,436 A | 6/1987 | Hagan | |
| 4,898,708 A * | 2/1990 | Holoubek | B29C 49/0073 264/514 |
| 4,939,890 A | 7/1990 | Peronek et al. | |
| 4,984,717 A | 1/1991 | Burton | |
| 5,097,990 A | 3/1992 | Goncalves | |
| 5,218,811 A | 6/1993 | LaPlante et al. | |
| 5,462,182 A | 10/1995 | Opresco | |
| 5,678,711 A | 10/1997 | Tobias | |
| 5,803,281 A | 9/1998 | Towns | |
| 5,836,364 A | 11/1998 | Burton | |
| 5,996,796 A * | 12/1999 | Kvitrud | B65D 1/02 206/459.1 |
| 6,588,627 B2 | 7/2003 | Petterson et al. | |
| 6,612,464 B2 | 9/2003 | Petterson et al. | |
| 6,698,160 B2 | 3/2004 | Peronek et al. | |
| 6,923,343 B1 | 8/2005 | Erxleben | |
| D581,272 S | 11/2008 | Yourist et al. | |
| 2002/0148800 A1 | 10/2002 | Ozawa et al. | |
| 2004/0238475 A1 | 12/2004 | Peronek | |
| 2005/0127022 A1 | 6/2005 | Flashinski et al. | |
| 2006/0060554 A1 | 3/2006 | Garman | |
| 2007/0245538 A1 | 10/2007 | Salameh | |
| 2009/0236244 A1 | 9/2009 | Frutin | |
| 2009/0321286 A1 | 12/2009 | Frutin | |
| 2010/0012532 A1 | 1/2010 | Frutin | |
| 2011/0017701 A1 | 1/2011 | Soliman | |
| 2011/0101036 A1 | 5/2011 | Wanbaugh et al. | |
| 2011/0174827 A1 | 7/2011 | Patel et al. | |
| 2012/0211457 A1 | 8/2012 | Patel et al. | |
| 2012/0211458 A1 | 8/2012 | Patel et al. | |

FOREIGN PATENT DOCUMENTS

| | | |
|---|---|---|
| FR | 2582509 A1 | 12/1986 |
| FR | 2846946 A1 | 5/2004 |
| GB | 1224940 A | 3/1971 |
| GB | 2205614 A | 12/1988 |
| JP | A-S61-47363 A | 3/1986 |
| JP | 2002-362607 A | 12/2002 |
| JP | A 2008-247412 A | 10/2008 |
| WO | WO 2004/007291 A1 | 1/2004 |

OTHER PUBLICATIONS

U.S. Appl. No. 13/031,883 (U.S. Pat. No. 8,935,904), filed Feb. 22, 2011 (Jan. 20, 2015).
U.S. Appl. No. 14/571,654 (U.S. Pat. No. 9,745,118), filed Dec. 16, 2014 (Aug. 29, 2017).
U.S. Appl. No. 14/571,654, Jul. 24, 2017 Issue Fee Payment.
U.S. Appl. No. 14/571,654, Apr. 24, 2017 Notice of Allowance.
U.S. Appl. No. 14/571,654, Apr. 3, 2017 Request for Continued Examination (RCE).
U.S. Appl. No. 14/571,654, Mar. 2, 2017 Advisory Action.
U.S. Appl. No. 14/571,654, Feb. 10, 2017 Applicant Initiated Interview Summary.
U.S. Appl. No. 14/571,654, Feb. 7, 2017 Response after Final Office Action.
U.S. Appl. No. 14/571,654, Nov. 1, 2016 Final Office Action.
U.S. Appl. No. 14/571,654, Sep. 26, 2016 Response to Non-Final Office Action.
U.S. Appl. No. 14/571,654, Jun. 14, 2016 Non-Final Office Action.
U.S. Appl. No. 14/571,654, Nov. 10, 2015 Response to Non-Final Office Action.
U.S. Appl. No. 14/571,654, Aug. 10, 2015 Non-Final Office Action.
U.S. Appl. No. 13/031,877, Aug. 10, 2015 Amendment and Request for Continued Examination (RCE).
U.S. Appl. No. 13/031,877, Aug. 20, 2015 Notice of Allowance.
U.S. Appl. No. 13/031,877, Nov. 20, 2015 Issue Fee Payment.
U.S. Appl. No. 13/031,877, Nov. 5, 2013 Non-Final Office Action.
U.S. Appl. No. 13/031,877, Oct. 14, 2013 Response to Restriction Requirement.
U.S. Appl. No. 13/031,877, Sep. 13, 2013 Restriction Requirement.
U.S. Appl. No. 13/031,877, May 15, 2014 Final Office Action.
U.S. Appl. No. 13/031,877, Sep. 24, 2014 Advisory Action.
U.S. Appl. No. 13/031,877, Jun. 9, 2015 Examiner's Answer to Appeal Brief.
U.S. Appl. No. 13/031,877, Dec. 15, 2014 Appeal Brief Filed.
U.S. Appl. No. 13/031,877, Oct. 15, 2014 Notice of Appeal Filed.
U.S. Appl. No. 13/031,883, Oct. 14, 2013 Response to Restriction Requirement.
U.S. Appl. No. 13/031,833, Sep. 13, 2013 Restriction Requirement.
U.S. Appl. No. 13/031,883, Feb. 5, 2014 Non-Final Office Action.
U.S. Appl. No. 13/031,883, May 5, 2014 Response to Non-Final Office Action.
U.S. Appl. No. 13/031,883, May 28, 2014 Final Office Action.
U.S. Appl. No. 13/031,883, Aug. 28, 2014 Response to Final Office Action.
U.S. Appl. No. 13/031,883, Sep. 12, 2014 Examiner Initiated Interview Summary.
U.S. Appl. No. 13/031,883, Sep. 12, 2014 Notice of Allowance.
U.S. Appl. No. 13/031,883, Dec. 12, 2014 Issue Fee Payment.

\* cited by examiner

METHOD OF STABILIZING A PLASTIC AEROSOL CONTAINER

CROSS-REFERENCE TO RELATED APPLICATIONS

This application is a continuation of U.S. patent application Ser. No. 14/571,654, filed, Dec. 16, 2014, which is a divisional of U.S. patent application Ser. No. 13/031,883, filed on Feb. 22, 2011, now U.S. Pat. No. 8,935,904 issued Jan. 20, 2015, the entire contents of which are hereby incorporated by reference in their entirety and from which priority is claimed.

BACKGROUND OF THE INVENTION

1. Field of the Invention

This invention relates broadly to the field of containers that are adapted to hold highly pressurized contents, such as aerosol mixtures, and more particularly to a blow molded plastic aerosol container having a finish portion that is constructed and arranged to provide maximum resistance to deformation and stress cracking at high internal pressures.

2. Description of the Related Technology

Aerosol containers have conventionally been fabricated from metal, and are conventionally formed as a cylindrical tube having upper and lower end closures. The bottom end closure is typically shaped as a concave dome, and the upper end closure typically includes a manually actuatable valve for dispensing the pressurized aerosol contents of the container.

Metallic containers have certain inherent disadvantages, such as a tendency to rust over time and to scratch surfaces with which they may come into contact.

Efforts have been made in the past to develop plastic aerosol containers, but have encountered difficulties, mainly relating to controlling the deformation of the plastic material as a result of the significant internal pressurization that is necessary in an aerosol container. Aerosol containers commonly require internal pressures of the magnitude of 50-300 psi, which is significantly greater than pressures that are typically encountered in other packaging applications for which plastic material has been used, such as the packaging of carbonated beverages. Accordingly, design considerations for plastic aerosol containers are quite different than they are for lower pressure packaging applications such as plastic beverage containers.

One common type of plastic container is fabricated from a material such as polyethylene terephthalate (PET) and is manufactured from an injection molded preform having a threaded finish portion using the reheat stretch blow molding process. While such containers hold some promise for aerosol applications, they are susceptible to stress cracking in the finish portion while under pressurization. In addition, the finish portion of such containers has a tendency to deform when the container is pressurized, possibly resulting in a loss of sealing integrity between the container and the aerosol dispensing closure.

A need exists for an improved blow molded plastic aerosol container that is less susceptible to stress cracking and deformation in the finish region than are conventional blow molded plastic containers.

SUMMARY OF THE INVENTION

Accordingly, it is an object of the invention to provide an improved blow molded plastic aerosol container that is less susceptible to stress cracking and deformation in the finish region than are conventional blow molded plastic containers.

In order to achieve the above and other objects of the invention, a plastic aerosol container according to a first aspect of the invention includes a main body portion that is constructed and arranged to withstand aerosol pressurization within a range that is about 50-300 psig. The plastic aerosol container further includes a finish portion that is unitary with the main body portion. The finish portion has a side wall, an upper sealing surface and a support ledge. The plastic aerosol container further includes reinforcement structure positioned beneath the support ledge for reinforcing the finish portion against deformation due to the pressurization.

A method of stabilizing an aerosol container of the type that has a plastic container having a finish portion with a side wall, an upper sealing surface and a support ledge according to a second aspect of the invention includes steps of forming reinforcement structure beneath the support ledge for reinforcing the finish portion against deformation due to pressurization; installing an aerosol dispensing closure onto the finish portion; and pressurizing the container with an aerosol mixture that is pressurized within a range that is about 50-300 psig.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
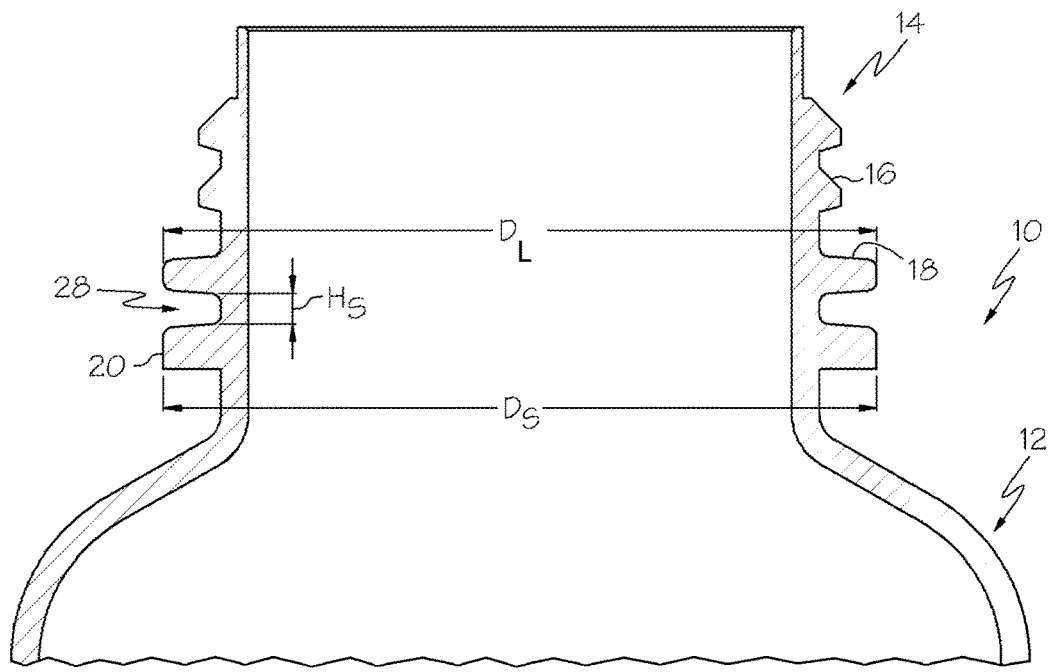
FIG. 1 is a fragmentary cross-sectional view taken along lines 1-1 in FIG. 2.
Figure 2:
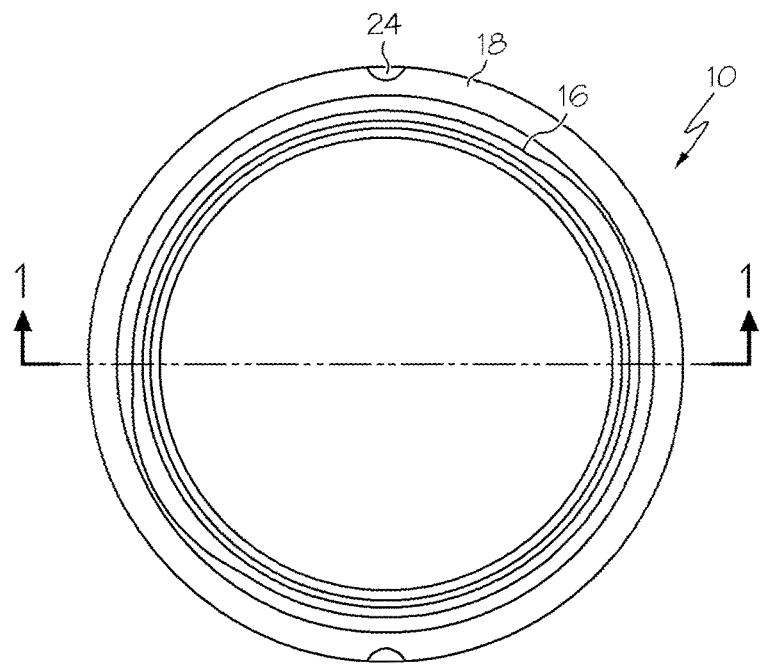
FIG. 2 is a top plan view of an aerosol container assembly that is constructed according to a preferred embodiment of the invention.

Referring now to the drawings, wherein like reference numerals designate corresponding structure throughout the views, and referring in particular to FIG. 1, an aerosol container assembly 10 that is constructed according to a preferred embodiment of the invention includes a plastic aerosol container having a main body portion 12 that is constructed and arranged to withstand aerosol pressurization within a range of about 50 psig to about 300 psig. More preferably, the main body portion 12 is constructed and arranged to withstand aerosol pressurization within a range of about 90 psig to about 180 psig.

Plastic aerosol container 10 is preferably fabricated from a plastic material such as polyethylene terephthalate (PET), polyethylene naphthalate (PEN), acrilonitrile (AN), polycarbonate (PC), polyamide (Nylon), or a blend containing some combination of the same from a plastic preform using a conventional blow molding process such as the reheat stretch blow molding process.

In the preferred embodiment, container 10 is fabricated from a high intrinsic viscosity polyethylene terephthalate material, which most preferably has an intrinsic viscosity that is substantially within a range of about 0.76 to about 0.95.

Container 10 preferably has an average wall thickness in the main body portion 12 that is substantially within a range of about 0.018 inch to about 0.022 inch, permitting it to withstand aerosol pressures.

The aerosol container 10 further preferably includes a threaded finish portion 14 that is unitary with the main body portion 12 and that has at least one helical thread 16 defined thereon for receiving an aerosol dispensing closure assembly or a closure that is designed to accept an aerosol fitment. Finish portion 14 further includes a support ledge 18 beneath the helical thread 16, which is used to help convey the container 10 during manufacture and filling. The support ledge 18 has a first maximum outer diameter $D_L$, as is best shown in FIG. 1.

The support ledge 18 is preferably constructed so that it has a substantially circular circumference as viewed in top plan. In the preferred embodiment, the outer circumference of the support ledge 18 includes a pair of small recesses 24, which are used for registering the closure fitment to the finish of the container 10 during the capping process.

The threaded finish portion 14 further includes reinforcement structure that is positioned beneath the support ledge for reinforcing the finish portion 14 against deformation due to the pressurization within the aerosol container 10. In the preferred embodiment, the reinforcement structure includes at least one secondary flange 20, which is positioned beneath the support ledge 18 on the threaded finish portion 14. The secondary flange 20 is preferably constructed so that it has an outer circumference that is noncircular in at least one location, so that it may be engaged during a capping operation to prevent rotation of the container 10 during capping. The secondary flange 20 is preferably unitary with the side wall of the finish portion 14.

Figure 9:
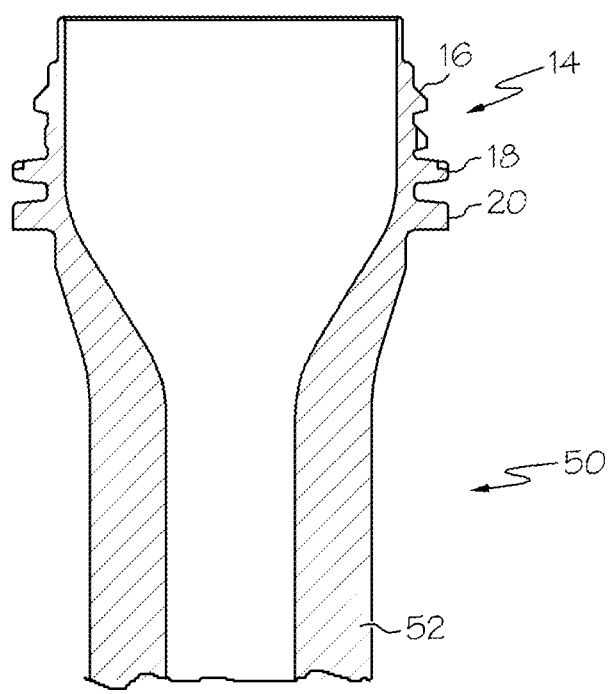
FIG. 9 is a fragmentary cross-sectional view taken through a preform that is constructed according to the preferred embodiment of the invention.

The secondary flange 20 in the preferred embodiment is fabricated using an injection molding process together with the rest of a plastic preform 50, shown in FIG. 9, which is used to manufacture the aerosol container 10 using a reheat stretch blow molding process. The plastic preform 50 includes a body portion 52.

Figure 7:
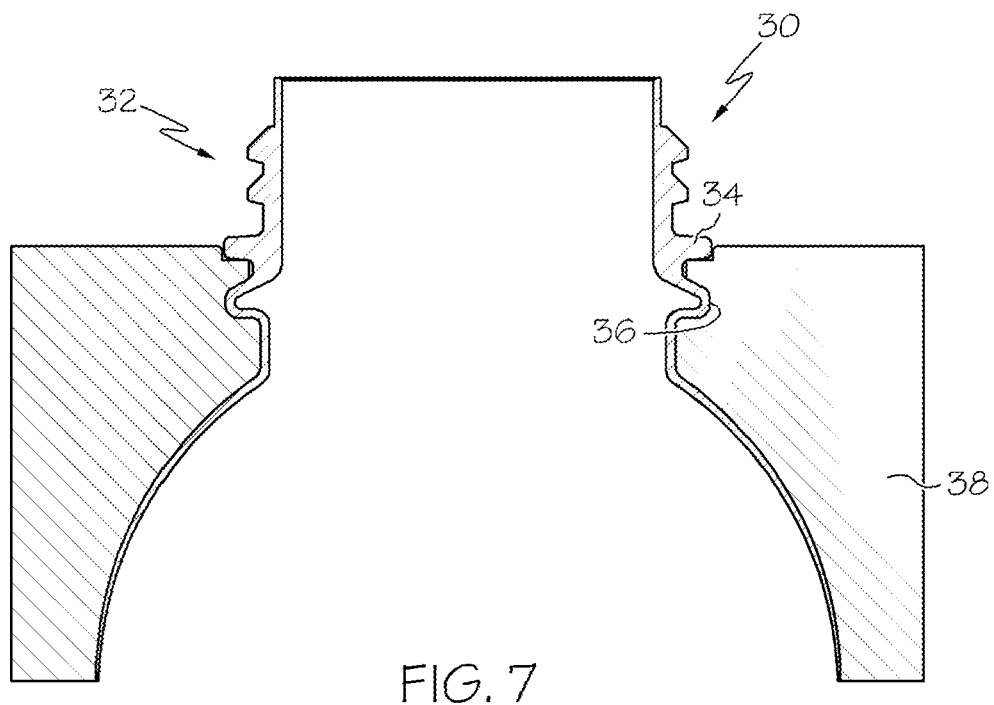
FIG. 7 is a diagrammatical view depicting the manufacture of an aerosol container according to an alternative embodiment of the invention.

In an alternative embodiment of the invention, shown in FIG. 7, a blow molded aerosol container 30 includes a threaded finish portion 32 having a support ledge 34 and a secondary flange 36. In this embodiment, the reinforcement structure is embodied as a secondary flange 36 that is fabricated in an upper part of the main body portion 12 during the blow molding process through the use of a mold 38, and is not part of the preform that is used to manufacture the container 30.

In another alternative embodiment of the invention, anti-rotation features could be incorporated into the support ledge of the finish portion without the provision of a secondary flange. For example, the support ledge could be provided with two or more flat surfaces, grooves or notches on the underside of the support ledge or one or more lugs or notches on the top surface of the support ledge.

The secondary flange 20 is preferably constructed so as to have a second maximum outer diameter $D_s$, which is not substantially greater than the first maximum outer diameter $D_L$ of the support ledge 18. Preferably, the second maximum outer diameter $D_s$ of the secondary flange 20 is substantially the same as the first maximum outer diameter $D_L$ of the support ledge 18.

Figure 3:
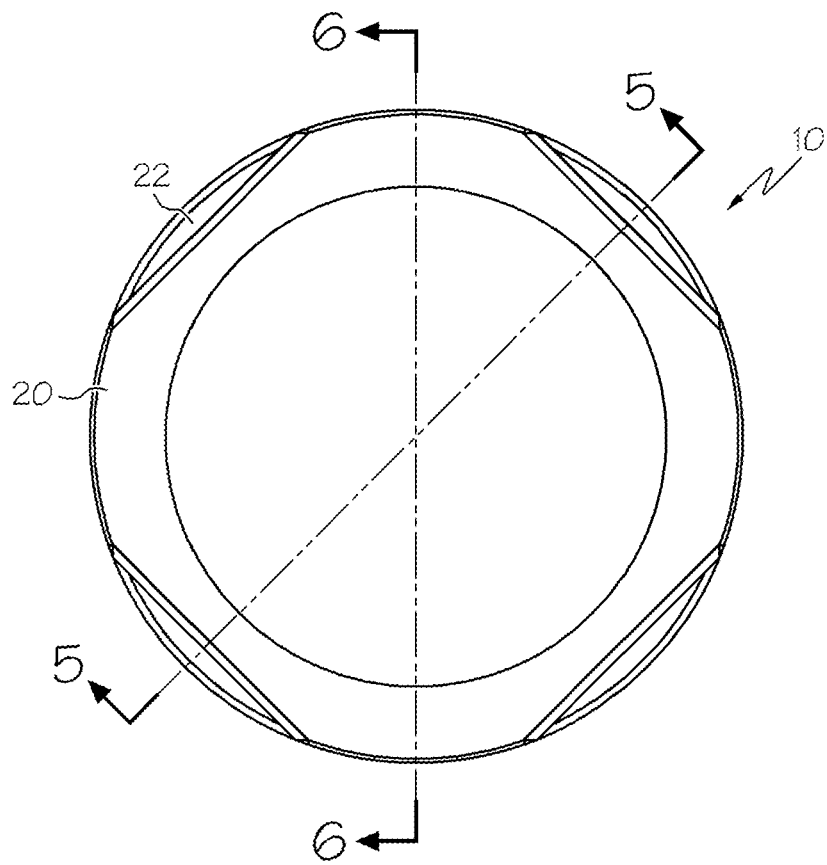
FIG. 3 is a bottom plan view of the aerosol container assembly that is shown in FIG. 2.
Figure 4:
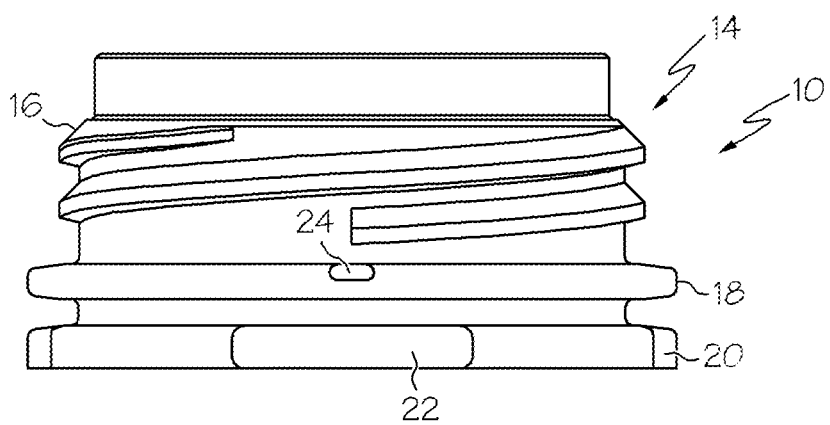
FIG. 4 is a side elevational view of the finish portion of the aerosol container assembly that is shown in FIG. 2.
Figure 5:
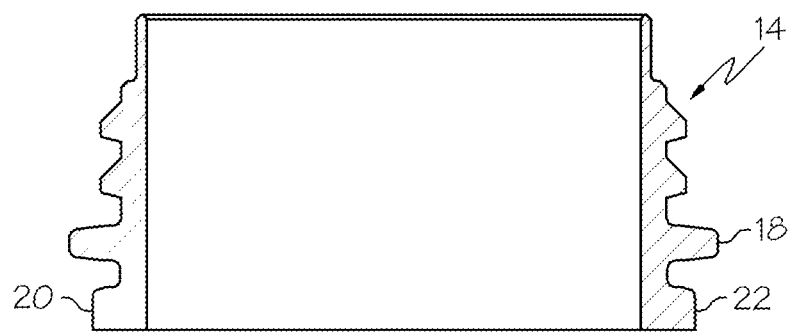
FIG. 5 is a cross-sectional view taken along lines 5-5 in FIG. 3.
Figure 6:
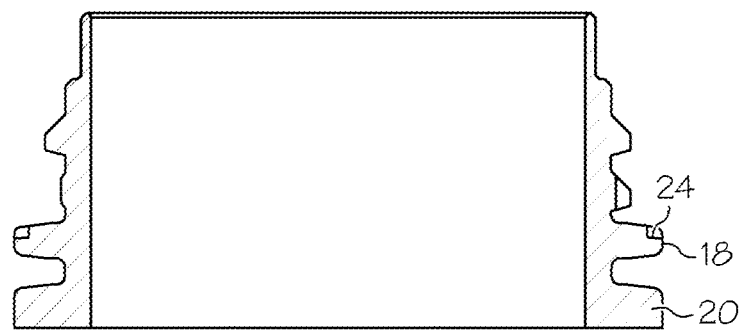
FIG. 6 is a cross-sectional view taken along lines 6-6 in FIG. 3.

Preferably, the secondary flange 20 has at least one substantially flat portion defined thereon that may be engaged by a capping machine in order to prevent relative rotation of the container 10 with respect to the capping machine during the capping process. As is best shown in FIG. 3, the secondary flange 20 preferably has four flat portions 22 that are evenly spaced around the circumference of the secondary flange 20.

As FIG. 1 shows, an annular space 28 is defined between the support ledge 18 and the secondary flange 20. Annular space 28 has a minimum vertical dimension $H_s$ that is preferably at least about 1 mm, and that is more preferably at least about 1.5 mm.

Figure 8:
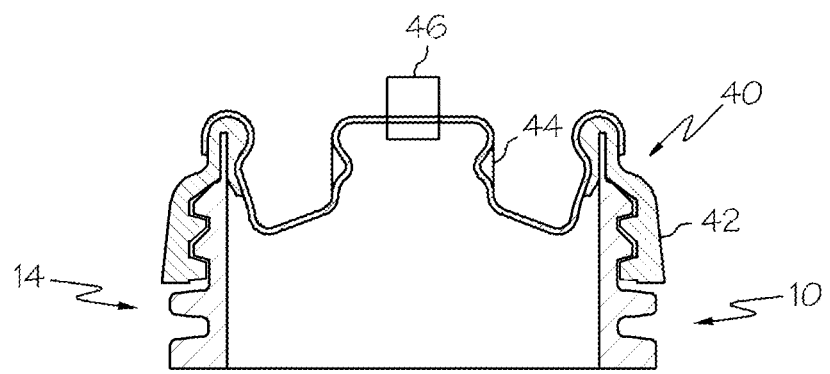
FIG. 8 is a diagrammatical view depicting an aerosol closure assembly according to the preferred embodiment of the invention.

The aerosol container assembly further includes an aerosol dispensing closure 40, which is diagrammatically shown in FIG. 8. Aerosol dispensing closure 40 preferably includes an apron or collar 42 that is adapted to be threaded onto and sealed to the threaded finish portion 14. Securing structure is preferably provided in order to prevent the consumer from unscrewing the aerosol dispensing closure 40 from the container 10, which in the preferred embodiment is a glue material that is applied to apron 42 of the aerosol closure 40 and the finish portion 14.

The aerosol dispensing closure 40 preferably includes a metallic insert 44 having a central opening in which an aerosol dispensing valve 46 is positioned.

Figure 10:
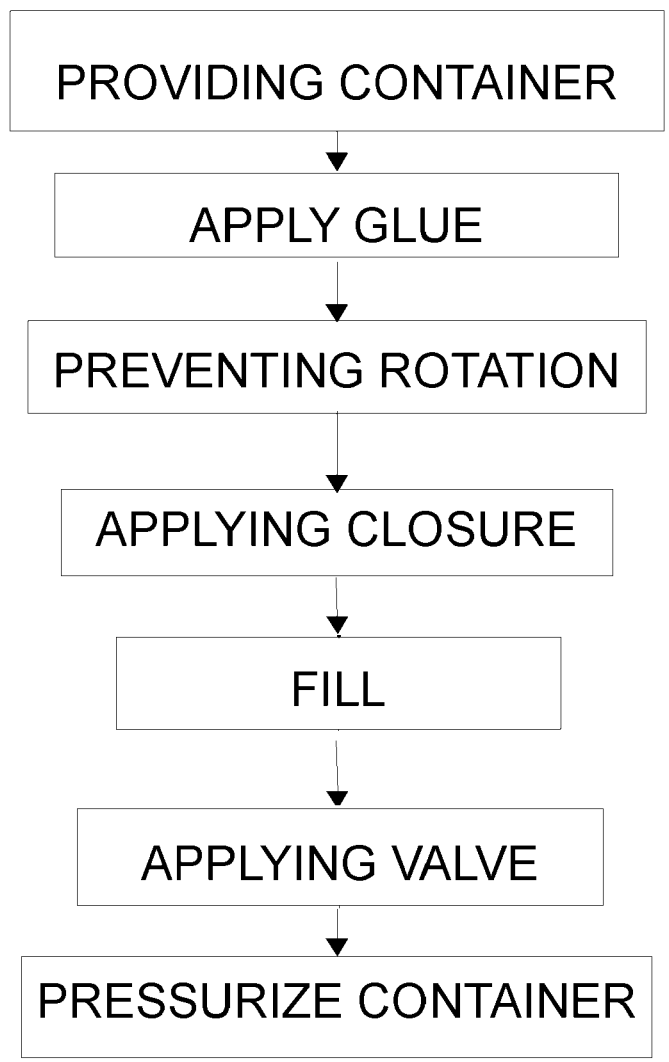
FIG. 10 is a flowchart depicting a method according to the preferred embodiment of the invention.

A method of assembling an aerosol container assembly according to the preferred embodiment of the invention is shown diagrammatically in FIG. 10. It includes providing a container 10 as described above having a threaded finish portion 14, a support ledge 18 positioned beneath the threaded finish portion and a secondary flange 20 positioned beneath the support ledge 18. The secondary flange 20 preferably has at least one noncircular portion.

The collar 42 of the aerosol dispensing closure 40 is then installed by screwing it onto the threaded finish portion 14, preferably by using a commercial capping machine. During the capping process, the container 10 is secured against rotation relative to the capping machine by engagement of a portion of the capping machine with the noncircular portion of the secondary flange 20. The collar 42 of the aerosol dispensing closure 40 is preferably screwed onto the threaded finish portion at a torque that is substantially within a range of about 15 in-lbs to about 50 in-lbs. The container 10 is then filled with product, after which the metallic insert 44 of the aerosol dispensing closure assembly 40 is applied to the collar and the container is pressurized with an aerosol mixture at a range of pressurization that is substantially between about 50 psig to about 300 psig, and more preferably substantially within a range of about 90 psig to about 180 psig using known aerosol pressurization processes and equipment.

The aerosol mixture preferably includes a propellant, which could be a liquefied gas propellant or a compressed or soluble gas propellant. Liquefied gas propellants that could be used include hydrocarbon propellants such as propane, isobutene, normal butane, isopentane, normal pentane and dimethyl ether, and hydrofluorocarbon propellants such as difluoroethane (HFC-152a) and tetrafluoroethane (HFC-134a). Compressed and soluble gas propellants that could be used include carbon dioxide (CO2), nitrous oxide (N2O), nitrogen (N2) and compressed air.

Figure 11:
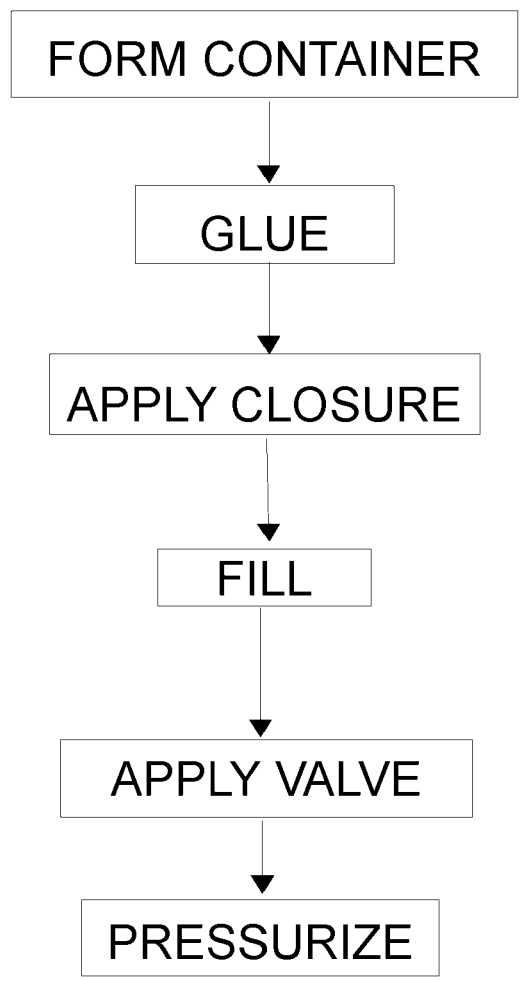
FIG. 11 is a flowchart depicting another method according to the preferred embodiment of the invention.

A method of stabilizing an aerosol container according to the preferred embodiment of the invention, shown diagrammatically in FIG. 11, includes fabricating an aerosol container 10 that is constructed as described above, with the reinforcement structure formed beneath the support ledge 18 for reinforcing the finish portion 14 against deformation due to pressurization. An aerosol dispensing closure 40 is then installed by screwing onto the threaded finish portion 14 at the preferred torque that is described above. The plastic aerosol container 10 is then pressurized with an aerosol mixture within a range of pressurization that is preferably about 50-300 psig. When under pressurization, the reinforcement structure prevents deformation of the finish portion 14, particularly the upper sealing surface of the finish portion 14 that bears against the underside of the aerosol dispensing closure 40. This helps ensure the integrity of the aerosol container assembly against loss of pressurization, and increases the potential shelf life of the aerosol container assembly.

Figure 12:
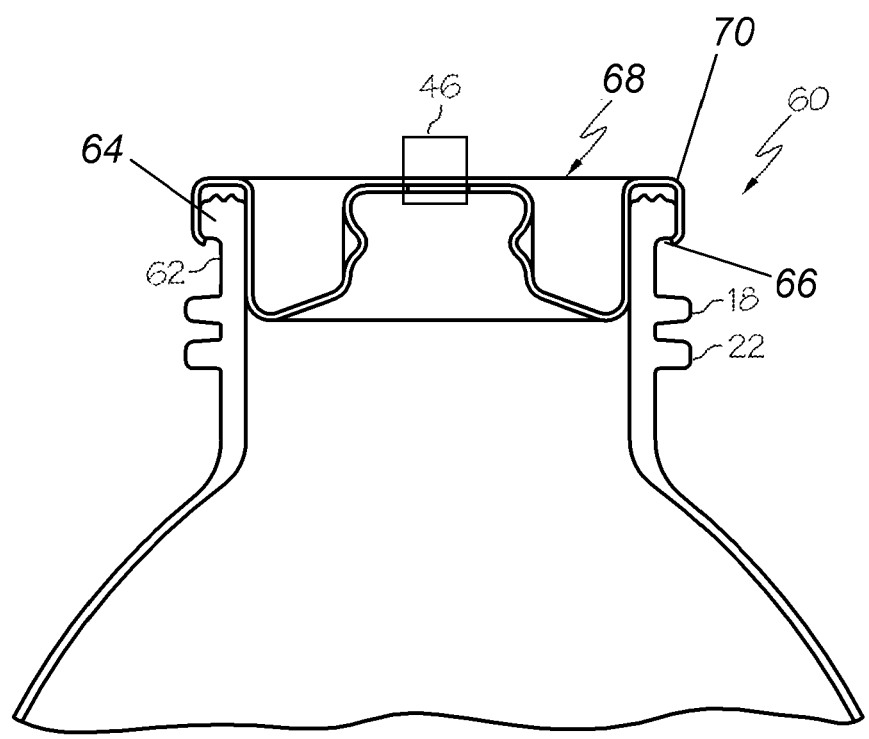
FIG. 12 is a fragmentary cross-sectional view taken through an aerosol container assembly that is constructed according to an alternative embodiment of the invention.

An aerosol dispensing container 60 according to a alternative embodiment of the invention is depicted in FIG. 12. Aerosol dispensing container 60 includes an unthreaded finish portion 62 having a support ledge 18 and a secondary flange 20, each of which is preferably constructed identically to those described above with reference to the previous embodiment. Unthreaded finish portion 62 further includes an upper bead 64 defining an upper rim of the container 60, and an undercut 66 on an outer surface of the finish portion 62. An aerosol valve assembly 68 has a flange portion 70 that is designed to be installed onto the finish portion 62 by crimping the outer circumferential edge of the flange portion 70 about the upper bead 64 and the undercut 66.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A plastic aerosol container, comprising:
   a main body portion that is constructed and arranged to withstand aerosol pressurization within a range that is about 50-300 psig;
   a finish portion that is unitary with the main body portion, the finish portion having a sidewall and an upper sealing surface, the finish portion further including securement means to secure an aerosol dispensing closure to the finish portion, a support ledge positioned beneath the securement means; and
   a reinforcement structure positioned beneath the support ledge for reinforcing the finish portion against deformation due to pressurization;
   wherein the reinforcement structure comprises a secondary flange that is unitary with the side wall of the finish portion; and
   the secondary flange has an outer circumference that is non-circular in at least one location.

2. An aerosol container according to claim 1 wherein the support ledge has a circular circumference when viewed in top plan.

3. An aerosol container according to claim 2 wherein the circumference of the support ledge includes a pair of closure fitment registering recesses.

4. An aerosol container according to claim 1, wherein the secondary flange is fabricated by injection molding or blow molding.

5. An aerosol container according to claim 1, further comprising an aerosol dispensing closure mounted to the finish portion.

6. An aerosol container according to claim 1, wherein the securement means comprises a threaded finish portion, and the main body portion and securement means are fabricated from a material comprising polyethylene terephthalate.

7. An aerosol container according to claim 1, wherein a space is defined between the support ledge and the secondary flange, and wherein the space has a minimum vertical dimension that is at least about 1 mm.

8. An aerosol container according to claim 7, wherein the minimum vertical dimension is at least about 1.5 mm.

9. An aerosol container according to claim 1, wherein the securement means comprises an upper bead.

10. A method of stabilizing an aerosol container of the type that has a plastic container having a finish portion with a sidewall, an upper sealing surface and a support ledge, the method comprising:
    forming a securement structure above the support ledge;
    forming reinforcement structure beneath the support ledge for reinforcing the finish portion against deformation due to pressurization;
    installing an aerosol dispensing closure to the securement structure on the finish portion; and
    pressurizing the container with an aerosol mixture that is pressurized within a range that is about 50-300 psig;
    wherein the reinforcement structure comprises a secondary flange that is unitary with the side wall of the finish portion, and has an outer circumference that is non-circular in at least one location.

11. A method of stabilizing an aerosol container according to claim 10, wherein the secondary flange is fabricated by blow molding or by injection molding.

12. A method of stabilizing an aerosol container according to claim 10, wherein the finish portion and the main body portion are fabricated from a material comprising polyethylene terephthalate.

13. A method of stabilizing an aerosol container according to claim 10, wherein the securement structure comprises a threaded finish portion.

14. A method of stabilizing an aerosol container according to claim 10, wherein the securement structure comprises an upper bead.

15. The method of claim 14, wherein installing the aerosol dispensing closure comprises crimping the aerosol dispensing closure to the upper bead.

* * * * *